(12) United States Patent
Yin

(10) Patent No.: US 12,498,080 B2
(45) Date of Patent: Dec. 16, 2025

(54) MULTI-FUNCTIONAL GIMBAL AND TRIPOD

(71) Applicant: Fotopro (Guangdong) Image Industrial Co., Ltd., Guangdong (CN)

(72) Inventor: Huibin Yin, Guangdong (CN)

(73) Assignee: Fotopro (Guangdong) Image Industrial Co., Ltd., Zhongshan (CN)

( * ) Notice: Subject to any disclaimer, the term of this patent is extended or adjusted under 35 U.S.C. 154(b) by 33 days.

(21) Appl. No.: 18/433,504

(22) Filed: Feb. 6, 2024

(65) Prior Publication Data

US 2024/0344652 A1 Oct. 17, 2024

(30) Foreign Application Priority Data

Apr. 17, 2023 (CN) .......................... 202320846668.2

(51) Int. Cl.
*F16M 11/14* (2006.01)

(52) U.S. Cl.
CPC ....... *F16M 11/14* (2013.01); *F16M 2200/021* (2013.01)

(58) Field of Classification Search
CPC ............. F16M 11/14; F16M 2200/021; F16M 11/123; F16M 11/1205; F16M 11/12; F16M 11/121; F16M 11/125; F16M 11/126; F16M 11/128; F16M 11/02; G03B 17/561

USPC ........................................... 248/181.1, 177.1
See application file for complete search history.

(56) References Cited

U.S. PATENT DOCUMENTS

| | | | |
|---|---|---|---|
| 1,798,446 A * | 3/1931 | Zerk .................... | G03B 17/561 |
| | | | 248/183.4 |
| 11,339,916 B2 * | 5/2022 | Smith .................... | F16M 11/10 |
| 2013/0051783 A1 * | 2/2013 | Piccoli .................. | F16M 11/18 |
| | | | 396/428 |
| 2016/0061377 A1 * | 3/2016 | Nakatani .............. | F16M 11/242 |
| | | | 248/184.1 |
| 2023/0048054 A1 * | 2/2023 | Zhou ...................... | F16M 11/10 |
| 2024/0126150 A1 * | 4/2024 | Zou ........................ | F16M 11/16 |

* cited by examiner

*Primary Examiner* — Christopher Garft

(57) ABSTRACT

Provided are a multi-functional gimbal and a tripod. The multi-functional gimbal includes a first adjustment base, where a ball head structure is disposed at a lower end of the first adjustment base; a second adjustment base, connected to an upper end of the first adjustment base through a horizontal adjustment structure; and a mounting base, connected to the second adjustment base through a vertical adjustment structure, where an imaging device is mounted on the mounting base. An angle between the mounting base and the second adjustment base in a vertical direction is adjusted through the vertical adjustment structure, an angle between the second adjustment base and the first adjustment base in a horizontal direction is adjusted through the horizontal adjustment structure, and an angle of the first adjustment base is adjusted through the ball head structure. The imaging device can be adjusted at different angles through the foregoing structure.

16 Claims, 3 Drawing Sheets

MULTI-FUNCTIONAL GIMBAL AND TRIPOD

TECHNICAL FIELD

The present disclosure relates to the field of photography equipment, and in particular to a multi-functional gimbal and a tripod.

BACKGROUND

A gimbal is photography equipment that is used to assist in shooting. During use, the gimbal is mounted on a tripod, and an imaging device is mounted on the gimbal. In a video shooting process, a shooting angle in a horizontal direction and a shooting angle in a vertical direction usually need to be adjusted. To overcome unevenness of a site, a ball head structure is disposed to implement horizontal shooting, vertical shooting, and shooting at a tilt angle. In combination with an adjustment structure for the shooting angle in the horizontal direction, the imaging device can maintain horizontal shooting even in an uneven site. In an existing gimbal with the adjustment structure for the shooting angle, an adjustment structure for the three shooting angles is disposed on the gimbal as follows: An adjustment structure for the shooting angle in the vertical direction is disposed at an upper end of the gimbal, a ball head structure is disposed at a middle of the gimbal, and an adjustment structure for the shooting angle in the horizontal direction is disposed at a lower end of the gimbal. Horizontal shooting can be maintained even in the uneven site. However, because the adjustment structure for the shooting angle in the horizontal direction is located at the lower end, when a shooting angle of the imaging device in the horizontal direction is adjusted, horizontal shooting of the imaging device is damaged, which causes great inconvenience. Therefore, there is an urgent need for a multi-functional gimbal and a tripod.

SUMMARY

The present disclosure aims to solve at least one of the technical problems existing in the prior art. Therefore, the present disclosure provides a multi-functional gimbal and a tripod.

The following technical solution is adopted to resolve the technical problems in one embodiment of the present disclosure: A multi-functional gimbal includes:
  a first adjustment base, where a ball head structure is disposed at a lower end of the first adjustment base;
  a second adjustment base, connected to an upper end of the first adjustment base through a horizontal adjustment structure; and
  a mounting base, connected to the second adjustment base through a vertical adjustment structure, where an imaging device is mounted on the mounting base.

An angle between the mounting base and the second adjustment base in a vertical direction is adjusted through the vertical adjustment structure, an angle between the second adjustment base and the first adjustment base in a horizontal direction is adjusted through the horizontal adjustment structure, and an angle of the first adjustment base is adjusted through the ball head structure.

Further, the horizontal adjustment structure includes:
  a connection base, connected to an upper end surface of the first adjustment base through a detachable structure, where a mounting groove is disposed on the connection base;
  a bearing, disposed inside the mounting groove, where an outer ring of the bearing is connected to an inner wall of the mounting groove; and
  a connection assembly, connected to an inner ring of the bearing and the second adjustment base, to enable the second adjustment base to drive the inner ring of the bearing to rotate in the horizontal direction relative to the outer ring of the bearing, the connection base, and the first adjustment base.

Further, the connection assembly includes:
  a connection head on which a threaded groove is disposed, where the connection head is connected to the inner ring of the bearing; and
  a threaded rod, threaded from top to bottom on the second adjustment base and connected inside the threaded groove in a threaded manner.

Further, the connection head is connected to the first adjustment base through a limiting structure, to enable the connection head and the first adjustment base to rotate synchronously.

Further, the limiting structure includes a limiting groove provided on the first adjustment base and a limiting piece disposed on the connection head, and when the connection head is connected to the inner ring of the bearing, the limiting piece extends into the limiting groove.

Further, the limiting piece is formed by cutting two sides of the connection head.

A clamping groove is provided on a side wall of the mounting groove, and a clamping ring that abuts against a lower end of the connection head is disposed inside the clamping groove.

A locking structure is disposed between the second adjustment base and the connection base, and used to limit relative rotation between the second adjustment base and the connection base.

Further, the multi-functional gimbal further includes a horizontal bead disposed on the mounting base.

A tripod includes the gimbal.

The present disclosure has the following beneficial effect. According to the multi-functional gimbal and the tripod, the multi-functional gimbal includes the first adjustment base, where the ball head structure is disposed at the lower end of the first adjustment base; the second adjustment base is connected to an upper end of the first adjustment base through a horizontal adjustment structure; and the mounting base is connected to the second adjustment base through a vertical adjustment structure, where an imaging device is mounted on the mounting base. The angle between the mounting base and the second adjustment base in the vertical direction is adjusted through the vertical adjustment structure, the angle between the second adjustment base and the first adjustment base in the horizontal direction is adjusted through the horizontal adjustment structure, and the angle of the first adjustment base is adjusted through the ball head structure. The imaging device can be adjusted at a plurality of angles through the foregoing structure. In addition, the present disclosure ensures that the imaging device can still be adjusted horizontally in an uneven site, meeting usage needs of a complex shooting environment with desirable practicability.

BRIEF DESCRIPTION OF THE DRAWINGS

The above and/or additional aspects and advantages of the present disclosure will become apparent and readily comprehensible from the description of embodiments in conjunction with the following accompanying drawings.

DETAILED DESCRIPTION OF THE EMBODIMENTS

A specific embodiment of the present disclosure will be described in detail below. A preferred embodiment of the present disclosure is illustrated in the accompanying drawings. The accompanying drawings serve to supplement the text description herein with figures, providing a visual understanding of each technical feature and the overall technical solution of the present disclosure, but cannot be construed as a limitation to the protection scope of the present disclosure.

In the description of the present disclosure, "a plurality of" means two or more; and the terms such as "greater than", "less than", and "more than" are construed as exclusive of the numerical value stated, and the terms such as "above", "below", and "within" are construed as inclusive of the numerical value stated. The "first" and "second" in the description are merely intended to distinguish technical features, rather than to indicate or imply relative importance or implicitly indicate a number of the indicated technical features or implicitly indicate a sequence relationship of the indicated technical features.

In the description of the present disclosure, it should be understood that orientation or position relationships indicated by terms "upper", "lower", "front", "rear", "left", and "right" are orientation or position relationships shown in the accompanying drawings, and these terms are just used to facilitate description of the present disclosure and simplify the description, but not to indicate or imply that the mentioned device or element must have a specific orientation and must be constructed and operated in a specific orientation, and thus cannot be construed as a limitation to the present disclosure.

In the present disclosure, unless otherwise explicitly specified, the terms such as "arrange", "mount" and "connect" should be broadly understood. For example, they may be a direct connection, or an indirect connection by means of an intermediate medium; may be a fixed connection, a detachable connection or integral molding; may be a mechanical connection; or may be internal communication between two elements or an interactive relationship between two elements. Those skilled in the art may reasonably determine the specific meanings of the above terms in the present disclosure according to the specific contents of the technical solution.

Figure 1:
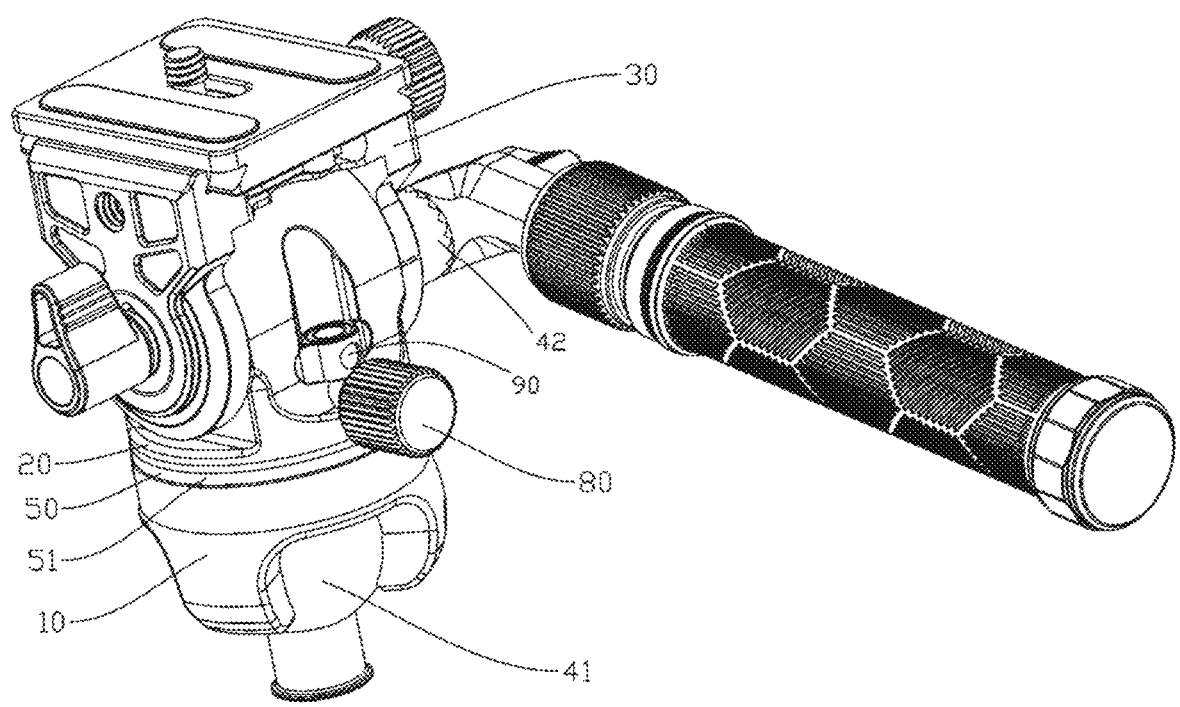
FIG. 1 is a schematic diagram of a structure of a multi-functional gimbal.
Figure 2:
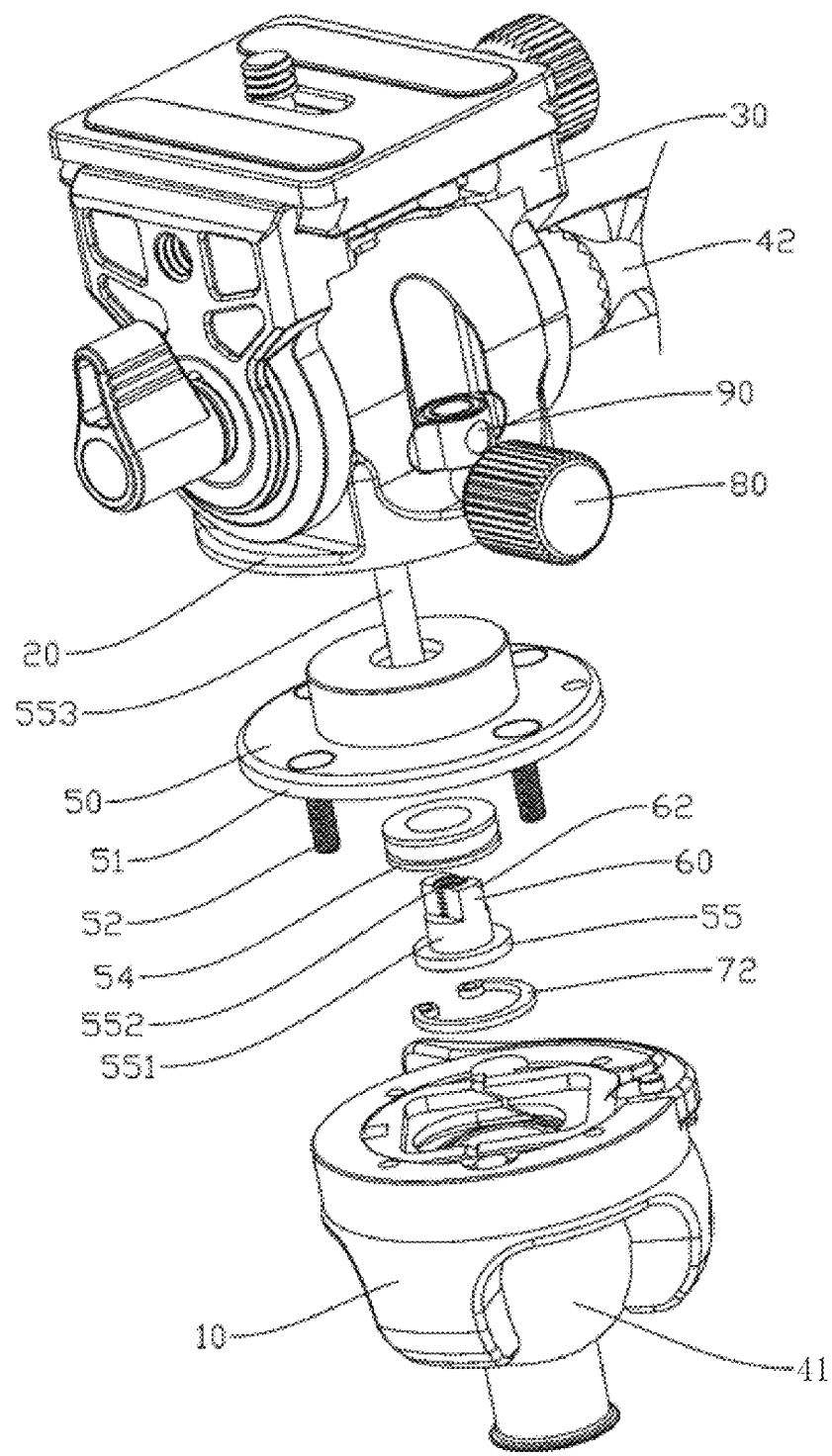
FIG. 2 is a first exploded view of a multi-functional gimbal.
Figure 3:
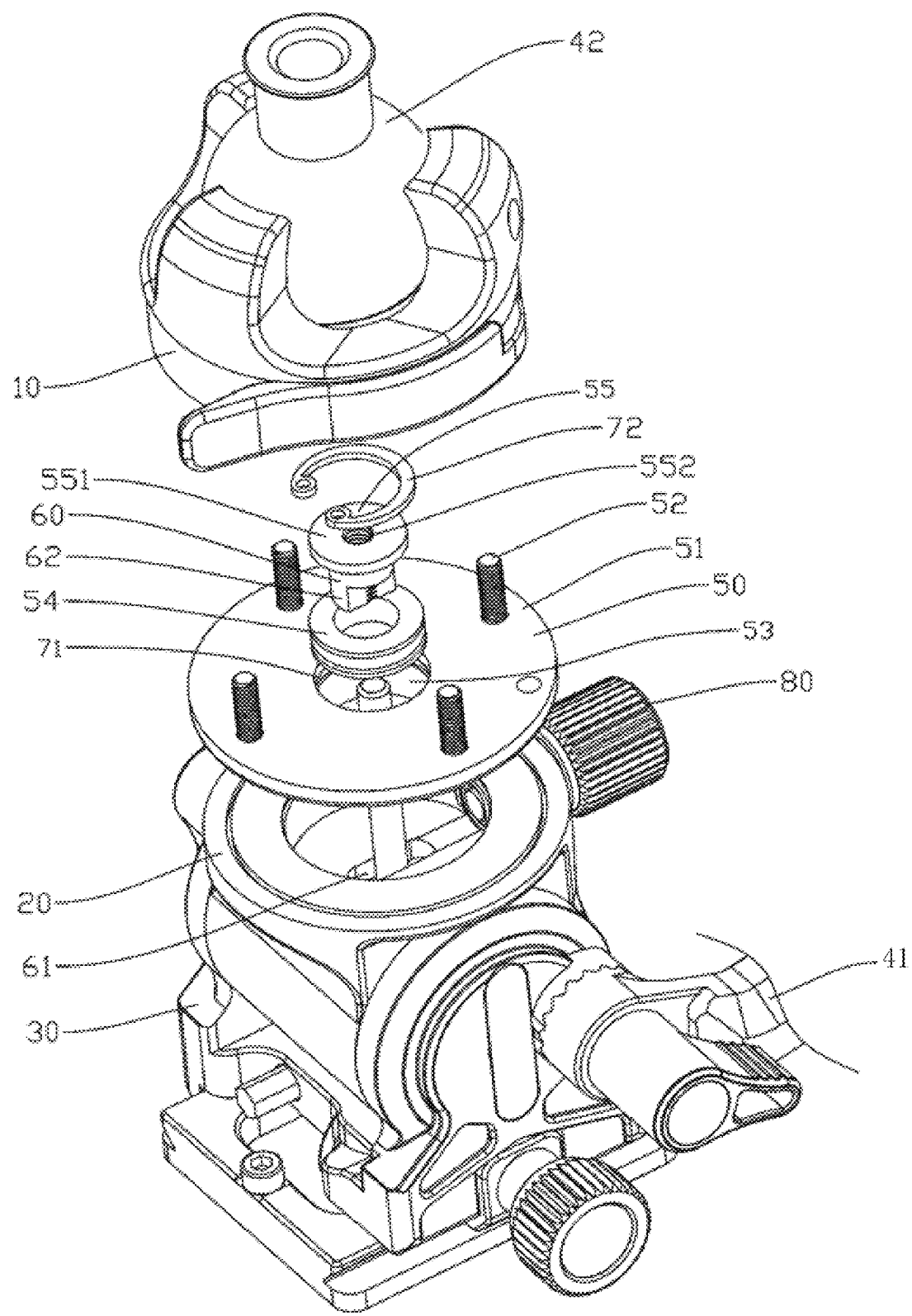
FIG. 3 is a second exploded view of a multi-functional gimbal.

Referring to FIG. 1 to FIG. 3, a multi-functional gimbal includes: a first adjustment base 10, a second adjustment base 20, and a mounting base 30.

A ball head structure 41 is disposed at a lower end of the first adjustment base 10.

The second adjustment base 20 is connected to an upper end of the first adjustment base 10 through a horizontal adjustment structure 50.

The mounting base 30 is connected to the second adjustment base 20 through a vertical adjustment structure 42, where an imaging device is mounted on the mounting base 30.

An angle between the mounting base 30 and the second adjustment base 20 in a vertical direction is adjusted through the vertical adjustment structure 42, an angle between the second adjustment base 20 and the first adjustment base 10 in a horizontal direction is adjusted through the horizontal adjustment structure 50, and an angle of the first adjustment base 10 is adjusted through the ball head structure 41.

(1) In the present disclosure, during assembling, the bearing 54 is first mounted in the mounting groove 53 disposed on the connection base 51, to enable the outer ring of the bearing 54 to be connected to the inner wall of the mounting groove 53. Then the connection head 551 is inserted in the inner ring of the bearing 54, and the clamping ring 72 is clamped in the clamping groove 71 disposed on the inner wall of the mounting groove 53, to enable the clamping ring 72 to abut against a lower end surface of the connection head 551. Therefore, the connection head 551 does not fall off in a subsequent mounting process. Then the connection base 51 is mounted on an upper end surface of the first adjustment base 10 through a bolt, and the second adjustment base 20 is placed on an upper end surface of the connection base 51.

In this case, the limiting piece 62 on the connection head 551 extends into the limiting groove 61 on the second adjustment base 20, and the threaded rod 553 passes through the second adjustment base 20 from top to bottom, and is connected to the connection head 551 in the mounting groove 53. Specifically, the threaded rod 553 is connected inside the threaded groove 552 on the connection head 551 in a threaded manner, to connect the connection base 51, the first adjustment base 10, and the second adjustment base 20 together. Finally, the mounting base 30 is connected to the second adjustment base 20 through the vertical adjustment structure 42. It should be noted that the ball head structure 41 and the vertical adjustment structure 42 in the present disclosure may adopt a structure on an existing gimbal, which are not described herein and not considered as a limitation to the present disclosure.

(2) According to the present disclosure, during use, the angle between the mounting base 30 and the second adjustment base 20 in the vertical direction may be adjusted through the vertical adjustment structure 42, so that the shooting angle of the imaging device in the vertical direction can be changed. Alternatively, the angle between the second adjustment base 20 and the first adjustment base 10 in the horizontal direction may be adjusted through the horizontal adjustment structure 50, so that the shooting angle of the imaging device in the horizontal direction may be changed. Alternatively, the angle of the first adjustment base 10 may be adjusted through the ball head structure 41, so that the imaging device can be switched between horizontal shooting and vertical shooting, and the shooting angle of the imaging device at an inclined angle can be changed. When a site is uneven, the imaging device may be adjusted to a horizontal position through the ball head structure 41. Specifically, whether the imaging device is located in the horizontal position may be observed through the horizontal level indicator on the second adjustment base 20. Because the horizontal adjustment structure 50 is located above the ball head structure 41, the ball head structure 41 does not affect adjustment on the shooting angle of the imaging device in the horizontal direction through the horizontal adjustment structure 50, and levelness of the imaging device is not affected.

(3) The present disclosure has the following advantages: The imaging device can be adjusted at a plurality of angles through the foregoing structure. In addition, the present disclosure ensures that the imaging device can still be adjusted horizontally in an uneven site, meeting usage needs of a complex shooting environment with desirable practicability.

As a preferred embodiment of the horizontal adjustment structure 50, the horizontal adjustment structure 50 includes: a connection base 51, a bearing 54, and a connection assembly 55.

The connection base 51 is connected to the upper end surface of the first adjustment base 10 through a detachable structure 52, and a mounting groove 53 is disposed on the connection base 51.

The bearing 54 is disposed inside the mounting groove 53, where an outer ring of the bearing 54 is connected to an inner wall of the mounting groove 53.

The connection assembly 55 is connected to an inner ring of the bearing 54 and the second adjustment base 20, to enable the second adjustment base 20 to drive the inner ring of the bearing 54 to rotate in the horizontal direction relative to the outer ring of the bearing 54, the connection base 51, and the first adjustment base 10.

The connection assembly 55 includes: a connection head 551 and a threaded rod 553.

A threaded groove 552 is disposed on the connection head 551, where the connection head 551 is connected to the inner ring of the bearing 54.

The threaded rod 553 is threaded from top to bottom on the second adjustment base 20 and connected inside the threaded groove 552 in a threaded manner.

The connection head 551 is connected to the first adjustment base 10 through a limiting structure 60, to enable the connection head 551 and the first adjustment base 10 to rotate synchronously.

The limiting structure 60 includes a limiting groove 61 provided on the first adjustment base 10 and a limiting piece 62 disposed on the connection head 551, and when the connection head 551 is connected to the inner ring of the bearing 54, the limiting piece 62 extends into the limiting groove 61. Because of this disposing, the second adjustment base 20 can drive the connection head 551 to synchronously rotate while rotating, so that the second adjustment base 20 rotates around the bearing relative to the first adjustment base 10, to adjust the shooting angle of the imaging device in the horizontal direction.

As a preferred embodiment of the limiting piece 62, the limiting piece 62 is formed by cutting two sides of the connection head 551.

A clamping groove 71 is provided on a side wall of the mounting groove 53, and a clamping ring 72 that abuts against a lower end of the connection head 551 is disposed inside the clamping groove 71.

A locking structure 80 is disposed between the second adjustment base 20 and the connection base 51, and used to limit relative rotation between the second adjustment base 20 and the connection base 51. It should be noted that the locking structure 80 may also adopt a structure on an existing gimbal, which is not described herein and not considered as a limitation to the present disclosure.

The multi-functional gimbal further includes a horizontal bead 90 disposed on the mounting base 30.

A tripod includes the gimbal.

Certainly, the present disclosure is not limited to the above implementation. Equivalent transformations and replacements may be made by those skilled in the art without departing from the spirit of the present disclosure, and shall fall within the scope defined by the claims of the present application.

What is claimed is:

1. A multi-functional gimbal, comprising:
   a first adjustment base (10), wherein a ball head structure (41) is disposed at a lower end of the first adjustment base (10);
   a second adjustment base (20), connected to an upper end of the first adjustment base (10) through a horizontal adjustment structure (50); wherein the horizontal adjustment structure (50) comprises:
   a connection base (51), connected to an upper end surface of the first adjustment base (10) through a detachable structure (52), wherein a mounting groove (53) is disposed on the connection base (51);
   a bearing (54), disposed inside the mounting groove (53), wherein an outer ring of the bearing (54) is connected to an inner wall of the mounting groove (53); and
   a connection assembly (55), connected to an inner ring of the bearing (54) and the second adjustment base (20), to enable the second adjustment base (20) to drive the inner ring of the bearing (54) to rotate in the horizontal direction relative to the outer ring of the bearing (54), the connection base (51), and the first adjustment base (10);
   a mounting base (30), connected to the second adjustment base (20) through a vertical adjustment structure (42), wherein an imaging device is mounted on the mounting base (30), and
   an angle between the mounting base (30) and the second adjustment base (20) in a vertical direction is adjusted through the vertical adjustment structure (42), an angle between the second adjustment base (20) and the first adjustment base (10) in a horizontal direction is adjusted through the horizontal adjustment structure (50), and an angle of the first adjustment base (10) is adjusted through the ball head structure (41).

2. The multi-functional gimbal according to claim 1, wherein the connection assembly (55) comprises:
   a connection head (551) on which a threaded groove (552) is disposed, wherein the connection head (551) is connected to the inner ring of the bearing (54); and
   a threaded rod (553), threaded from top to bottom on the second adjustment base (20) and connected inside the threaded groove (552) in a threaded manner.

3. The multi-functional gimbal according to claim 2, wherein the connection head (551) is connected to the first adjustment base (10) through a limiting structure (60), to enable the connection head (551) and the first adjustment base (10) to rotate synchronously.

4. The multi-functional gimbal according to claim 3, wherein the limiting structure (60) comprises a limiting groove (61) provided on the first adjustment base (10) and a limiting piece (62) disposed on the connection head (551), and when the connection head (551) is connected to the inner ring of the bearing (54), the limiting piece (62) extends into the limiting groove (61).

5. The multi-functional gimbal according to claim 4, wherein the limiting piece (62) is formed by cutting two sides of the connection head (551).

6. The multi-functional gimbal according to claim 2, wherein a clamping groove (71) is provided on a side wall of the mounting groove (53), and a clamping ring (72) that abuts against a lower end of the connection head (551) is disposed inside the clamping groove (71).

7. The multi-functional gimbal according to claim 1, wherein a locking structure (80) is disposed between the second adjustment base (20) and the connection base (51), and used to limit relative rotation between the second adjustment base (20) and the connection base (51).

8. The multi-functional gimbal according to claim 1, further comprising a horizontal level indicator (90) disposed on the mounting base (30).

9. A tripod, comprising the gimbal according to claim 1.

10. The tripod according to claim 9, wherein the connection assembly (55) comprises:
- a connection head (551) on which a threaded groove (552) is disposed, wherein the connection head (551) is connected to the inner ring of the bearing (54); and
- a threaded rod (553), threaded from top to bottom on the second adjustment base (20) and connected inside the threaded groove (552) in a threaded manner.

11. The tripod according to claim 10, wherein the connection head (551) is connected to the first adjustment base (10) through a limiting structure (60), to enable the connection head (551) and the first adjustment base (10) to rotate synchronously.

12. The tripod according to claim 11, wherein the limiting structure (60) comprises a limiting groove (61) provided on the first adjustment base (10) and a limiting piece (62) disposed on the connection head (551), and when the connection head (551) is connected to the inner ring of the bearing (54), the limiting piece (62) extends into the limiting groove (61).

13. The tripod according to claim 12, wherein the limiting piece (62) is formed by cutting two sides of the connection head (551).

14. The tripod according to claim 10, wherein a clamping groove (71) is provided on a side wall of the mounting groove (53), and a clamping ring (72) that abuts against a lower end of the connection head (551) is disposed inside the clamping groove (71).

15. The tripod according to claim 9, wherein a locking structure (80) is disposed between the second adjustment base (20) and the connection base (51), and used to limit relative rotation between the second adjustment base (20) and the connection base (51).

16. The tripod according to claim 9, wherein the multi-functional gimbal further comprises a horizontal level indicator (90) disposed on the mounting base (30).

* * * * *